Figure 1:
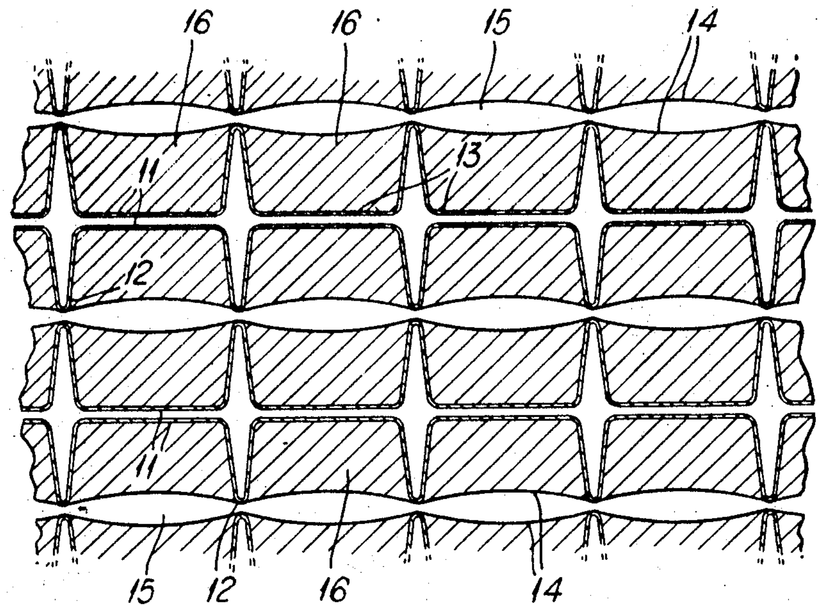

United States Patent

[11] 3,608,729

[72] Inventor Geoffrey Gordon Haselden
Leeds, England

[21] Appl. No. 763,269
[22] Filed Sept. 27, 1968
[45] Patented Sept. 28, 1971
[73] Assignee National Research Development Corporation
London, England
[32] Priority Sept. 27, 1967
[33] Great Britain
[31] 43954

[54] DISPOSABLE DIALYSER PACK WITH ADSORBENT
11 Claims, 2 Drawing Figs.

[52] U.S. Cl. .......... 210/321
[51] Int. Cl. .......... B01d 13/00
[50] Field of Search .......... 210/22, 23, 321, 266

[56] References Cited
UNITED STATES PATENTS

| | | | |
|---|---|---|---|
| 3,397,785 | 8/1968 | Jarvis et al. .......... | 210/321 X |
| 2,502,614 | 4/1950 | Zender .......... | 210/321 X |

*Primary Examiner*—J. L. DeCesare
*Attorney*—Jacobs and Jacobs

ABSTRACT: A self-contained pack for hemodialysis comprising a stack of rigid plastic sheets each formed with ridges and valleys and arranged in oppositely facing pairs, with pairs of flexible dialysis membranes interposed between the pairs of rigid sheets in the stack. The spaces between the paired membranes serve as blood flow passages, while the ridges of the rigid sheets provide support for the membranes. The spaces in the valleys between the ridges are packed with adsorbent material, e.g. an ion-exchange resin, immersed in nonflowing dialysis fluid.

26
27
24
25
23
18
22
24
24
16
11
14
15
25
21
17
20

PATENTED SEP 28 1971 3,608,729

Inventor
Geoffrey Gordon Haselden
By Jacobs & Jacobs
Attorney

DISPOSABLE DIALYSER PACK WITH ADSORBENT

This invention relates to dialyzers, more particularly for use in artificial kidney machines.

During hemodialysis of a patient suffering from renal failure blood is withdrawn from one blood vessel, usually an artery, and subsequently returned into another blood vessel, usually a vein, after passage through the dialyzer which comprises, in essence, an arrangement of flow ducts for blood and dialysis fluid, respectively, on opposite sides of a dialysis membrane. The dialysis fluid, which may be a dilute aqueous solution based on tap water, flows from a source of supply through the appropriate dialyzer ducts and then to waste. The usual dialysis membrane employed is regenerated cellulose.

Although it is possible to pump the blood through the dialyzer by means of a peristaltic pump, the preferred machine has a pressure drop through the blood flow passages that is low enough for the patient's heart to be able to supply the necessary pumping action, rendering an external pump unnecessary. In one well-known form of dialyzer, two cooperating blocks of polypropylene plastic are secured to one another and have matching cavities in their mating faces such that enclosed chambers for dialysis are formed between the two blocks. Two contiguous sheets of regenerated cellulose are clamped between the two blocks so that they form membranes partitioning the dialysis chambers. Blood flow takes place between the two regenerated cellulose sheets, which are caused to bulge away from one another when the blood enters, while the dialysis fluid is supplied to the two spaces bounded by the regenerated cellulose membranes and walls of the cavities in the polypropylene blocks. In order to restrict the extent to which the regenerated cellulose membranes can bulge away from one another, and thereby limit the width of the blood flow passage and create the desired passages outside the membranes for dialysis fluid, the cavity walls of the polypropylene blocks are formed with a large number of comparatively closely spaced longitudinal ridges. The bulging of the membranes is therefore checked when they encounter the tops of these ridges.

Besides the fact that it requires highly skilled operation, a major disadvantage of this form of dialyzer is that, after a dialysis, it needs considerable labor on the part of an expert technician before the machine can be ready for use again. While the regenerated cellulose membranes are disposed of and replaced by fresh ones, so that the blood flow passages are, in fact, renewed and do not have to be cleaned, there remains the arduous task of cleaning and often sterilizing the polypropylene blocks. Moreover, this cleansing of the machine carries with it a risk of exposure of the technician and others to infection. After new membranes have been inserted and clamped between the blocks, the entire assembly is often pressure tested and finally sterilized by liquid means, necessitating removal of the disinfectant by repeated washings with sterile saline solution.

Another considerable disadvantage is that although an important function of the dialyzer is to remove a particular quantity of water from the patient's blood, as well as the impurities, with prior machines there has been no direct method of measuring the amount removed.

It is an object of the invention to provide a new concept in hemodialysis machines whereby the aforementioned disadvantages are overcome and the apparatus as a whole is simplified and cheapened and its operation made more versatile.

According to the invention, a self-contained dialyzer pack comprises a container which is divided internally by one or more semipermeable membranes into one or more blood flow passages and one or more chambers for a quantity of dialysis fluid, and the chambers containing the dialysis fluid are packed with a solid absorbent material. The adsorbent material may itself act as a support for the membranes or it may be packed into a grid or framework providing membrane support.

The passages for blood flow through the unit may be formed from one or more flattened tubes of a semipermeable membrane material, for example, regenerated cellulose. These membranes are supported externally of the blood flow passages by solid adsorbent material or by openwork plastic grids packed with the adsorbent. The adsorbent, or the plastic grids as the case may be, determine the extent to which the membranes can be pressed apart by the blood flow between them and hence the width of the blood passages which is quite critical. The membranes and the adsorbent are sealed in a suitable container, which also may be of plastic. The spaces within the container that hold the adsorbent are filled with dialysis fluid which saturates the adsorbent; the dialysis fluid does not flow as in previous machines although it may be displaced as hereinafter described. The complete unit forms a disposable pack which is presterilized during manufacture and may be supplied in an outer sealed wrapping.

Figure 2:
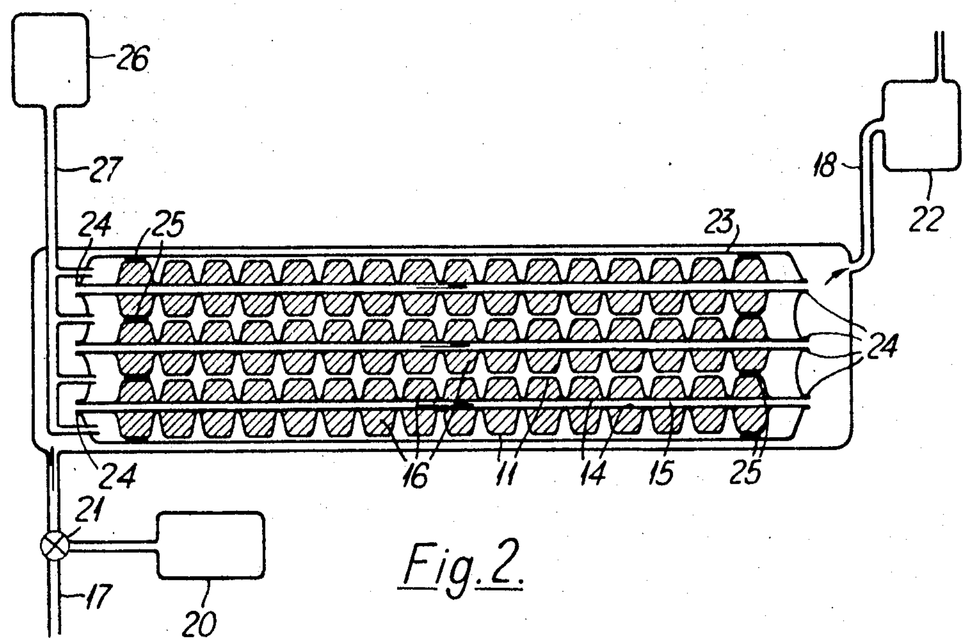

One form of construction in accordance with the invention is illustrated by way of example in the accompanying drawing, in which FIG. 1 is a diagrammatic cross section through part of a dialyser pack. FIG. 2 is a diagrammatic cross section through the complete pack.

Referring to the drawings, the pack comprises a stack of plates 11 each having a pattern of ridges 12 and valleys 13. Such plates can be made from thin synthetic plastics material by vacuum-moulding technique. The plates are arranged in oppositely facing pairs, and at each location between consecutive pairs there is inserted in the stack a pair of dialysis membranes 14, or alternatively a flattened tube of membrane material, to provide the blood flow passages 15. The membranes 14 of the blood flow passages are at least in part supported by the tops of the ridges 12 of the pairs of plates 11.

The residual space between the moulded plates 11 and the membranes 14, that is to say in the valleys 13 between the ridges 12, is packed with the dialysis-fluid-saturated adsorbent material 16, which may be applied to the plates 11 before assembly in finely divided form as a layer of paste, or it can be deposited in place as a filter cake from a thin slurry feed. The complete stack is sealed at the edges of the plates and membranes, and the whole inserted into an outer plastic cover 23. As can be seen in FIG. 2, the membranes 14 are sealed to one another and to the cover, as at 24, in such manner that fluid entering within the cover 23 is obliged to flow through the passages 15 between the pairs of membranes 14, as indicated by the arrows. The plates 11 are also sealed around their edges to one another and to the cover 23, as indicated at 25; no inflow and outflow connections to the spaces containing the dialysis-fluid-saturated adsorbent material 16 are provided, except that there is connection to an external variable volume bag as hereinafter described, the dialysis fluid being substantially static in these spaces during dialysis. Suitable connections such as conventional inlet and outlet means 17 and 18 as shown are provided for the inflow and outflow of blood to and from the passages 15 between the pairs of membranes 14.

The adsorbent may consist of a single material, such as an ion-exchange resin, or a number of different substances such as charcoal and an ion-exchange resin, which may be mixed or in separate channels or cavities, to adsorb different unwanted constituents of the blood. The material used could also include enzymes, to break down one or more of the unwanted constituents, together with other substances to take up the products of such degradation. Thus urease could be used to break down urea and ion-exchange resins or other adsorbents employed to adsorb the resulting ammonia and carbon dioxide. The use of preloaded ion-exchange resins, having a high capacity for electrolytes containing essential ions such as potassium and sodium, will facilitate the regulation of the concentration of these ions in the patient's bloodstream.

In use, the unit is connected to the patient in the normal way, the blood passages having suitable inlet and outlet connections. Since the actual geometry of the blood flow passages can be varied greatly and the pressure drop through them need not be larger than that of previous low pressure drop units, no pump is normally necessary. During the dialysis the substances to be removed from the blood pass through the membranes to the dialysis fluid and thence into the adsorbent. By keeping the layer of dialysis fluid between the membrane and the adsorbent thin, its resistance to diffusion will also be kept low.

At the commencement of operation some dialysis fluid will be displaced as the blood enters and forces the membranes apart. An external variable volume bellows or collapsed bag 26 can be connected to the unit to receive this displaced fluid, all the spaces containing adsorbent being connected in common to this receiver bag via passages 27. By simple measurement or observation the fluid displaced at this stage can be determined. Since together with the removal of waste products, a purpose of the dialysis operation is, as mentioned previously, to withdraw a quantity of water from the patient's blood, the equivalent of this quantity can be drawn off from the dialysis fluid in the adsorbent spaces, the amount being controlled by simple external measurement, as for instance by means of the same or another variable volume bellows or bag.

At the end of the dialysis period, the blood flow is stopped at the inlet from the patient's artery and the blood in the unit is returned to the patient either by forcing dialysis fluid back into the pack to squeeze the membranes together, or by displacement by saline solution, or by a combination of both these methods. A variable volume bag 20 or sac containing saline solution can be built into the pack and connected to the blood inlet tube by means of a valve 21, a bursting disc or a capillary being provided to reduce diffusional flow.

At the blood outlet the unit may also have built in an air bubble rejector 22 of established design.

It may be desirable or necessary to introduce a small oscillatory displacement into the dialysate to improve the transport of metabolites from the membrane to the adsorbent. Some normal function or movement of the human body can be utilized in achieving this. For instance, it could be achieved by exploiting the pulsing of the arterial blood supply to the dialyzer pack to displace the membrane in the inlet region of the pack, while providing a flexible diaphragm to contain the dialysate in the outlet region of the pack. Or alternative means could be used which employed the breathing action or walking action of the patient to produce the required small oscillatory displacement of the dialysate.

Such a disposable pack for use in carrying out hemodialysis operations has a good number of advantages over the best of prior machines. The pack is self-contained and no pumps, controls or dialysis fluid dispenser are needed. The cost of the pack is only a small fraction of that of a conventional artificial kidney machine, making disposability a practical proposition from the economic point of view. The need for skilled technical assistance to rebuild, test or sterilize the unit at the place of usage is eliminated. And the pack remains sealed thereby reducing risk of infection.

The fact that the dialysis fluid is in limited quantity and sealed into the pack means that not only can it be presterilized along with the remainder of the pack but also it can be degassed and its composition especially with respect to electrolytes containing such essential ions as sodium, potassium and calcium, can be adjusted to suit different patients. Whereas withdrawal of a portion of the dialysis fluid as mentioned gives a precise determination of the desired loss of fluid from the patient's blood, it is no longer necessary to place the patient on a bed weigher which has been the only method available hitherto of obtaining an approximate indication of the fluid loss.

The dialysis operation is rendered safer, since there are fewer components that can fail and less reliance is placed on individual hospital staff. Indeed, the procedure is made so simple that home treatment should be more readily possible. The pack can be varied considerably in size and the possibility arises of smaller packs for shorter and more frequent dialysis treatments or even continuous dialysis, which may be by means of a portable pack worn by the patient.

It will be understood that the nature of the blood passage or passages through the adsorbent in a pack is a matter of choice and expediency. There may be a single passage following a straight or sinuous path or a number of passages in series or in parallel, the general aim being to maintain a low pressure drop while at the same time keeping the dimension of the pack convenient. Individual semipermeable membranes in the pack, and defining the blood flow passage or passages, will be conveniently rectangular but could have other configurations. Likewise the particular adsorbent material employed can be varied. The use of new membrane materials other than regenerated cellulose within the same or similar form of construction could lead to further improvement in the functioning of the pack. If nonthrombogenic membranes became available and were used in the pack the need to inject anticoagulants into the patient's bloodstream at the commencement of the dialysis could be largely or wholly avoided.

If the membrane material is sufficiently strong to withstand repeated use then the packs could be cleaned, recharged with dialysate, resterilized, and used again. The cleaning would normally be achieved by flowing warm water, or a weak aqueous solution, through either or both the blood and dialysate passages until the impurities gathered from the blood had been sufficiently removed. This could be done without dismantling the pack. These processes of cleaning and recharging could be carried out at centralized facilities away from the hospital or home. If the membrane material had sufficient strength and was physiologically compatible with the blood then a small pack constructed on the above principles could be carried by the patient and permanently connected to his bloodstream, and the adsorbent materials be regenerated periodically by flushing through with suitable aqueous solutions as outlined above.

The pack may include tubes necessary for conveying the patient's blood from the patient to the pack and back again, and it may also include the bubble rejector. The pack with or without these attachments may be enveloped in an outer disposable plastic wrapping in which it remains sterile during transit from the point of manufacture to that of use.

What is claimed:

1. A self-contained hemodialysis pack, comprising a sealed container which is divided internally by at least one semipermeable membrane into at least one blood flow passage and at least one chamber containing a quantity of dialysis fluid, a blood-inlet connection to said blood flow passage within the container, a blood outlet connection from said blood flow passage, at least one plate formed with a pattern of ridges and valleys and disposed within the container on the side of said semipermeable membrane opposite to the blood flow passage whereby said chamber containing dialysis fluid is defined between said semipermeable membrane and said plate, the ridges of said plate providing support for said membrane on one side thereof, and solid adsorbent material packed within the valleys of said plate and saturated with said dialysis fluid.

2. A pack according to claim 1, wherein the solid adsorbent material provides further support for said membrane on said one side thereof.

3. A pack according to claim 1, wherein the plate is formed of synthetic plastic material by vacuum-molding technique.

4. A pack according to claim 1, comprising a succession of said plates arranged in a stack in oppositely facing pairs, with pairs of said membranes inserted between consecutive pairs of said plates, the stack being sealed around the edges of the plates and membranes in such manner as to prevent escape of said dialysis fluid and to confine flow of blood to the passages between said pairs of membranes.

5. A pack according to claim 4, wherein each said pair of membranes is provided by opposite walls of a flattened tube of membrance material.

6. A pack according to claim 1, wherein the adsorbent comprises an ion-exchange resin.

7. A pack according to claim 1, wherein the adsorbent includes at least one enzyme.

8. A pack according to claim 1, wherein at least one variable volume bag is connected to the chamber containing the adsorbent and dialysis fluid.

9. A pack according to claim 1, wherein a variable volume container filled with saline solution is in valved communication with said blood inlet connection.

10. A pack according to claim 1, including an air bubble rejector in said blood outlet connection.

11. A disposable portable pack according to claim 1, presterilized and sealed in an outer wrapping.